(12) United States Patent
Wilson et al.

(10) Patent No.: US 11,733,090 B1
(45) Date of Patent: Aug. 22, 2023

(54) MARINE ANIMAL MONITORING DURING SEISMIC SURVEYING USING DISTRIBUTED ACOUSTIC SENSING

(71) Applicant: Halliburton Energy Services, Inc., Houston, TX (US)

(72) Inventors: Glenn Wilson, Houston, TX (US); Mikko K. Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/667,108

(22) Filed: Feb. 8, 2022

(51) Int. Cl.
*G01H 9/00* (2006.01)
*B63B 21/66* (2006.01)

(52) U.S. Cl.
CPC ............ *G01H 9/004* (2013.01); *B63B 21/66* (2013.01); *B63B 2211/02* (2013.01)

(58) Field of Classification Search
CPC .......... G01H 9/004; G01V 8/00; G01B 17/00; G01B 13/00; G01B 13/14; G01B 13/12; G01B 13/16; B63B 21/66; G63B 2211/02; G63B 2211/06; G63B 2211/04
See application file for complete search history.

(56) References Cited

U.S. PATENT DOCUMENTS

| 8,924,158 | B2* | 12/2014 | Kragh | ................ E21B 47/0224 702/17 |
| 2010/0067326 | A1 | 3/2010 | Iranpour et al. | |
| 2012/0020184 | A1* | 1/2012 | Wilson | ................... G01V 1/201 367/19 |
| 2012/0120760 | A1 | 5/2012 | Groenaas et al. | |
| 2014/0025319 | A1* | 1/2014 | Farhadiroushan | .... E21B 47/007 702/56 |
| 2014/0355379 | A1 | 12/2014 | Moldoveanu et al. | |
| 2015/0337642 | A1* | 11/2015 | Spacek | .................... G05B 9/02 700/275 |
| 2016/0131783 | A1 | 5/2016 | Sallas et al. | |
| 2018/0058202 | A1* | 3/2018 | Disko | ..................... E21B 47/12 |

(Continued)

FOREIGN PATENT DOCUMENTS

| CN | 113567559 | A | * | 10/2021 | |
| CN | 114696891 | A | * | 7/2022 | ......... G01M 11/088 |
| WO | WO-2018044470 | A1 | * | 3/2018 | ............ E21B 47/12 |

OTHER PUBLICATIONS

Foreign Communication from Related Application—International Search Report and Written Opinion of the International Searching Authority, International Application No. PCT/US2022/015748, dated Nov. 7, 2022 10 pages.

(Continued)

*Primary Examiner* — Thomas A Hollweg
*Assistant Examiner* — Mary A El-Shammaa
(74) *Attorney, Agent, or Firm* — Conley Rose, P.C.; Rodney B. Carroll (57) ABSTRACT

A method of monitoring a marine animal in a marine environment, implemented by an interrogator unit and a sensing attached to the interrogator, the method comprises deploying the sensing cable within a water column, interrogating, using the interrogator unit, the sensing cable, receiving acoustic data comprising acoustic signals generated by the marine animal, and processing, by a processor coupled to the interrogator unit, the acoustic data to detect a presence of the marine animal.

20 Claims, 5 Drawing Sheets

(56) References Cited

U.S. PATENT DOCUMENTS

2018/0328120 A1    11/2018  Therrien et al.
2021/0214058 A1*    7/2021  Hine ...................... H02S 20/30
2023/0026535 A1*    1/2023  Manning ................ B63G 8/001

OTHER PUBLICATIONS

Rivet, Diane et al., "Preliminary assessment of ship detection and trajectory evaluation using distributed acoustic sensing on an optical fiber telecom cable," The Journal of the Acoustical Society of America, 2021, vol. 149, pp. 2615-2627, Acoustical Society of America.

Nowacek, Douglas P. et al., "Responsible Practices for Minimizing and Monitoring Environmental Impacts of Marine Seismic Surveys with an Emphasis on Marine Mammals," Aquatic Mammals, 2013, vol. 39, No. 4, pp. 356-377 Springer Nature.

Kavanagh, A.S. et al., "Seismic surveys reduce cetacean sightings across a large marine ecosystem," Scientific Reports, 2019, vol. 9, pp. 1-10, Springer Nature.

Specification and Drawings for International Application No. PCT/US2022/15748, entitled "Marine Animal Monitoring During Seismic Surveying Using Distributed Acoustic Sensing," filed Feb. 9, 2022, 34 pages.

Taweesintananon, Kittinat et al., "Distributed acoustic sensing for near-surface imaging using submarine telecommunication cable: A case study in the Trondheimsfjord, Norway," Geophysics, Sep.-Oct. 2021, vol. 36, No. 5, pp. B303-B320, Society of Exploration Geophysicists.

\* cited by examiner

MARINE ANIMAL MONITORING DURING SEISMIC SURVEYING USING DISTRIBUTED ACOUSTIC SENSING

TECHNICAL FIELD

Embodiments of the disclosure are directed to monitor marine animals in a marine environment. More particularly, embodiments of the disclosure are directed to monitor marine animals before and/or during marine seismic surveying using distributed acoustic sensing (DAS) system.

BACKGROUND

Marine animals during offshore seismic surveys may generally be monitored by active look-outs on seismic survey vessels where people with binoculars scan the survey area for marine animal activity. As all marine mammals rely on acoustic signaling for important life functions, such as communication, orientation, or locating prey, active acoustic monitoring during seismic surveys may raise concern because it uses seismic sources, such as air guns, that produce loud sounds to penetrate the seafloor and may disturb and harm marine life. It may therefore be desirable to minimize seismic surveys and activity in areas where marine animals migrate or are present. Look-outs and people monitoring may not always identify marine animals in low-light environments, in various sea and wave conditions, or when the marine animals predominantly stay submerged. Thus, there is a desire to employ a more efficient monitoring system that has minimal impact on marine life.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure generally relates to passive acoustic monitoring systems and methods for detecting and localizing a marine animal using a sensing cable coupled with an interrogator unit to measure acoustic signals of the marine animal over a large area of water before and/or during a seismic survey/operation. The disclosed passive acoustic monitoring systems and methods may be integrated into the seismic survey system and employed to implement mitigation measures that minimize the impact of seismic activities on marine animal. In some embodiments, the marine animal may comprise a marine mammal, a fish, a cetacean, a crustacean, and/or a cephalopod.

The disclosed passive acoustic monitoring systems and methods for detecting or locating the marine animal may employ the sensing cable comprising a plurality of acoustic sensors to record the acoustic signals. The sensing cable may include one of a fiber-optic sensing cable, a telecommunications cable, an electrical cable, a subsea cable, an umbilical cable, a flowline cable, an array of optical/electrical hydrophones, and/or fiber-optic interferometric sensors.

In some embodiments, the interrogator unit may be a part of a distributed acoustic sensing (DAS) system or any other electrical or optical interrogation unit, coupled with the sensing cable (either on a seafloor or towed by a floating vessel) deployed in a water column, and configured to continuously measure/record real-time acoustic signals and/or vocalizations generated by the marine animal. Such measurements corresponding to the acoustic signals collected at the spatially separated acoustic sensors of the sensing cable allow to triangulate and assess the location of the marine animal, and thus the presence and information of the marine animal. In some embodiments, analysis of the received acoustic signals with the known amplitudes, frequencies, characteristics, and patterns of mammal vocalizations may be utilized to classify a species, a density (e.g., number of mammals), a call type, a calling location, a direction, distribution, a speed, and behavioral features of the marine animal. In some embodiments, the classification and analysis may be helpful to provide real-time marine animal information to the crew and/or seismic source operators for mitigative decision-making such as soft-start or ramping-up the seismic survey procedures, ceasing the seismic operations, or modifying the seismic operations in the presence of the marine animal.

In some embodiments, after detecting the marine animal or as a pre-caution, a controlled seismic survey may be soft started using a seismic source (e.g., an air gun array or a marine vibrator) to alert the marine animal close to the seismic source and to allow sufficient time for those animals to leave the immediate vicinity. In some implementations, a soft start of the seismic source may include initiating a start-up sequence from no seismic source emission and slowly ramp up the seismic source emission in a controlled fashion until a desired seismic source amplitude and profile has been reached. In some implementations, the seismic survey may be ceased until the marine animal cleared the survey area, or modified by 1) reducing and or changing amplitude and/or a frequency of air gun shots from the air gun array, 2) activating or inactivating individual airguns of the air gun array, 3) modifying or reducing air pressure supply to the air gun array, and/or 4) controlling sweep speed over the frequency range for the marine vibrator. In some embodiments, an automated mitigation may be employed when the marine mammal has been detected and preset operational/acquisition parameters are exceeded by a threshold limit.

In some embodiments, the disclosed continuous real-time marine mammal monitoring may be employed during the seismic survey/operation. While monitoring for the marine animals, the seismic survey may be conducted using the seismic source and the DAS system to determine the presence or absence of locations of hydrocarbon deposits. During the seismic survey, acoustic pulses are generated by the seismic source and transmitted through the water column into the sea bed. Then the reflected signals, recorded by a plurality of receiving sensors along the sensing cable, may provide information about the seafloor structure, including the presence of oil or gas. In some embodiments, the DAS system or the interrogator unit may be triggered, by activation of the seismic source (e.g., air gun shot), to start recording the reflected seismic signals offset from each shot point. In some embodiments, the seismic source events and recorded data may be synchronized with a global positioning system (GPS) to enable accurate depth determination of the seismic signals from the source and seismic subsurface reflection during processing.

In some embodiments, the receiving sensors may be used to record both the acoustic signals and seismic signals. The receiving sensors may comprise without limitations, fibers in subsea umbilicals, risers and flowlines (SURF) infrastructure, optical sensors, electrical sensors, DAS fiber-optic distributed sensors, towed electrical hydrophones arrays (i.e. underwater microphones), fiber-optic hydrophones, accelerometers, geophones, seafloor fiber-optic sensing arrays, seafloor electrical sensing arrays, ocean bottom sensor pods with four-dimensional (4D) mode (e.g., X/Y/Z geophones/accelerometers and/or hydrophones), and/or like.

Since the fiber-optic cables (e.g., umbilical cables or telecommunication cables) may span very large areas within the water column or ocean floor, the area for monitoring of marine animals and seismic sources may be very large. Thus, the ability to detect and recognize the acoustic signature of each species may allow marine animal identification from a large distance. As such, the use of fiber optic cables in marine environments may be beneficial to improve detection range. Furthermore, the disclosed DAS systems may be integrated with existing telecommunication fiber networks/fiber-optic cables, which may reduce dependency and cost on monitor vessels that accompany seismic acquisition vessels to perform the seismic survey.

Furthermore, the DAS system or any other interrogation system may be employed to record both the acoustic data related to marine animal and the seismic data related to hydrocarbon reservoir. Thus, the disclosed system may provide an integrated approach for monitoring of marine mammals and acquiring seismic data during the seismic survey.

Additional features and advantages of the disclosed embodiments will be or will become apparent to one of ordinary skill in the art upon examination of the following figures and detailed description. It is intended that all such additional features and advantages be included within the scope of the disclosed embodiments. Further, the illustrated FIGS. 1-5 are only exemplary and are not intended to assert or imply any limitation with regard to the environment, architecture, design, or process in which different embodiments may be implemented.

Figure 1:
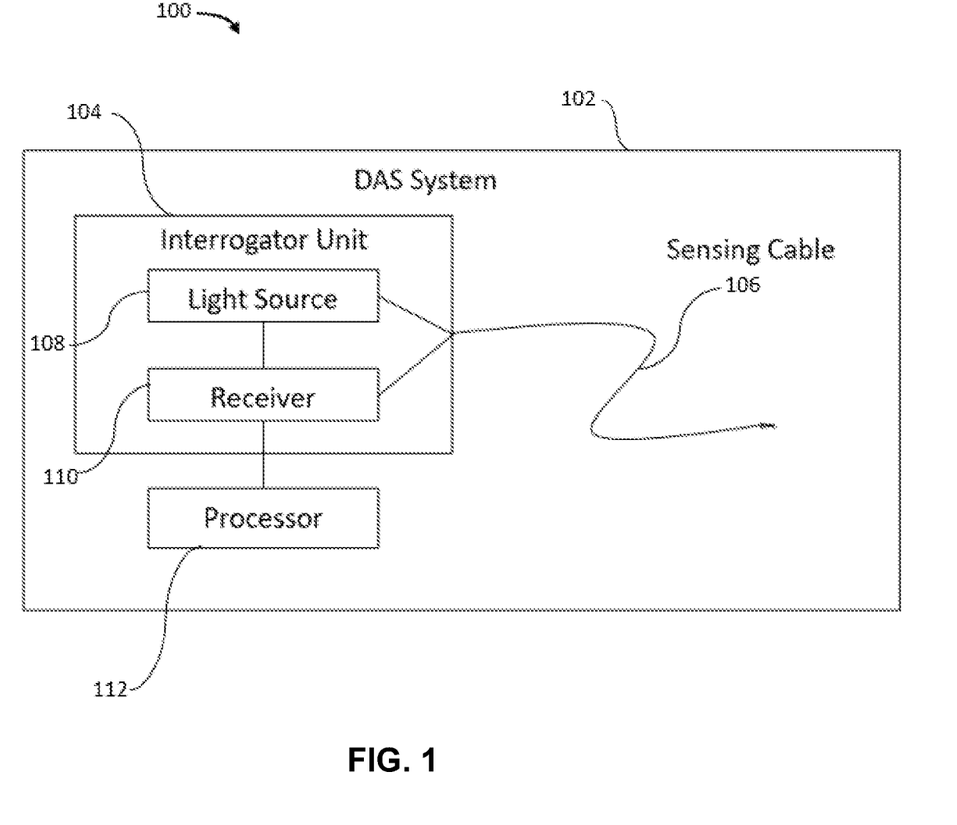
FIG. 1 illustrates a block diagram of an exemplary DAS system in accordance with embodiments of the present disclosure.

FIG. 1 illustrates a block diagram 100 of an exemplary DAS system in accordance with embodiments of the present disclosure. Embodiments of the present disclosure may employ a fiber-optic cable-based DAS system 102 to record acoustic signals generated by a marine animal to detect the presence of the marine animal and seismic signals associated with the presence of hydrocarbon reservoirs. In some embodiments, the DAS system 102 may be coupled to a sensing cable 106 comprising a plurality of receiving sensors (e.g., acoustic and/or seismic sensors) such as fiber-optic sensors, geophones, optical hydrophones, accelerometers, fiber-optic interferometric sensors, and/or like to measure the acoustic data and the seismic data. FIG. 1 shows a particular configuration of components of the DAS system 102. However, any suitable configurations of components may be used. The DAS system 102 may be inclusive of an interrogator unit 104 and the sensing cable 106 coupled to the interrogator.

While the DAS system 102 generally indicates a fiber optic DAS system and the interrogation unit 104 show the light source 108 indicating a fiber optic interrogator or a fiber optic sensing system, a person skilled in the art understands that any combination of optical and/or electrical sensors, and electrical and/or optical interrogators fall within the scope of the invention. In such implementations, the sensing cable 106 may be attached to an electric sensor and an electrical interrogator to receive acoustic data comprising acoustic signals generated by the marine animal.

In some embodiments, the sensing cable 106 may be a fiber-optic sensing cable, telecommunications cable, an electrical cable, an umbilical cable, a flowline cable, a subsea cable, or an array of optical/electrical hydrophones. The DAS interrogator 104 may comprise a light source 108 (e.g., a laser) that is configured to emit a plurality of coherent light frequencies into the sensing cable 106 and a receiver 110 to receive backscattered light from the plurality of receiving sensors of the sensing cable 106.

Additionally, within the DAS system, the interrogator 104 may be connected to a processor 112 through connection, which may be wired and/or wireless. It should be noted that both processor 112 and the DAS system 102 may be disposed on a fixed platform or a floating vessel. The processor 112 may be a part of the DAS system 102 or a separate processing unit disposed on a fixed platform or a floating vessel. Both systems and methods of the present disclosure may be implemented, at least in part, with processor 112. The processor 112 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. The processor 112 may include random access memory (RAM), one or more processing resources such as a central processing unit (CPU) or hardware or software control logic, ROM, and/or other types of nonvolatile memory. Additional components of the processor 112 may include one or more disk drives, one or more network ports for communication with external devices as well as an input device (e.g., keyboard, mouse, etc.), and video display. The processor 112 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media 140 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

In some examples, the DAS system 102 may interrogate the sensing cable 106 using coherent radiation and relies on interference effects to detect seismic disturbances on the sensing cable 106. For example, a mechanical strain on a section of optical fiber can modify the optical path length for scattering sites on the sensing cable 106, and the modified optical path length can vary the phase of the backscattered optical signal. The phase variation can cause interference among backscattered signals from multiple distinct sites along the length of the sensing cable 106 and thus affect the intensity and/or phase of the optical signal detected by the DAS system 102. In some instances, the seismic disturbances on the sensing cable 106 are detected by analysis of the intensity and/or phase variations in the backscattered signals.

Figure 2:
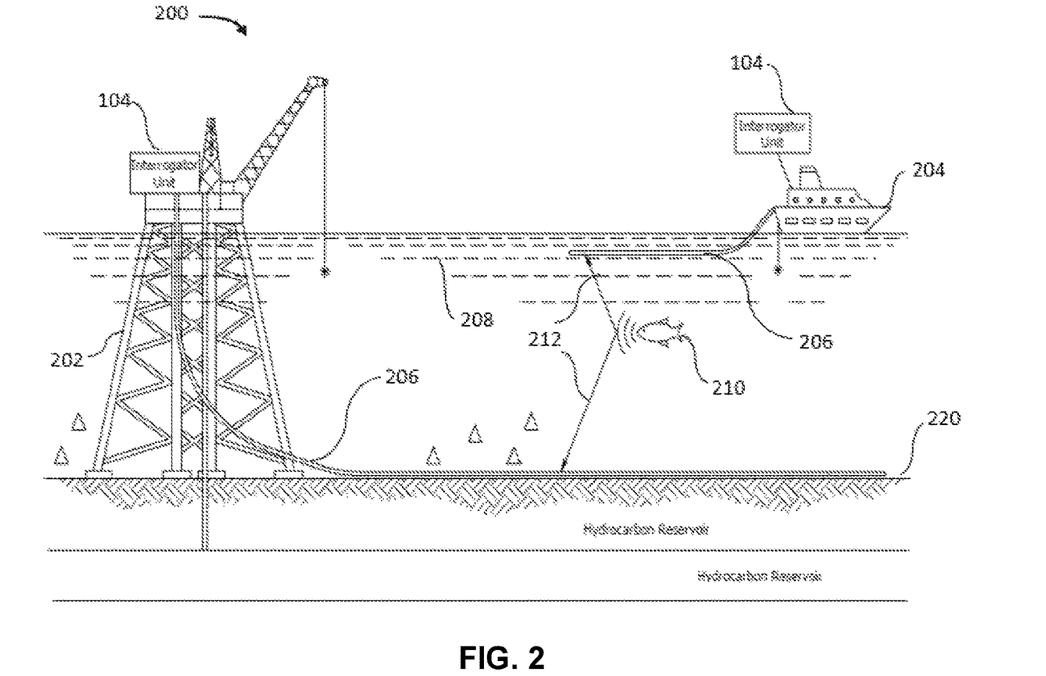
FIG. 2 illustrates an exemplary arrangement for monitoring a marine mammal in accordance with embodiments of the present disclosure.

FIG. 2 illustrates an exemplary arrangement for monitoring a marine mammal before and/or during a seismic survey in accordance with embodiments of the present disclosure. The marine mammal monitoring system 200 may include one or more of a fixed platform 202, a floating vessel 204 with a towed streamer, a sensing cable 206, and the interrogator unit 104. In some embodiments, the fixed platform 202 may comprise an offshore, semi-submersible oil and gas drilling platform/rig, a drillship, a pipe-laying slip, a tension-leg platforms (TLPs), a "spar" platform, a production platform, a sea-bed, and/or a sub-sea structure. In some embodiments, the floating vessel 204 may comprise a floating production, storage, and offloading (FPSO) vessel.

In some embodiments, any optical fibers located in sensing cables, SURF infrastructure, telecommunication cables, pipelines, and/or like located in the target area and connected to the appropriate interrogation unit for signal interrogation and processing may be used for passive monitoring of marine animal activity. Similarly, the same fibers and sensors may be used for active seismic monitoring during the seismic survey.

In some embodiments, the towed streamer may include the sensing cable 206 that comprises a plurality of receiving sensors distributed along the length of the sensing cable 206. In offshore environments, the sensing cable may comprise fiber optic cables for subsurface/downhole sensing deployed by dry-tree completions from offshore platforms, umbilical connecting topside facilities to subsea infrastructure, flowlines connecting production infrastructure, or telecommunications fibers connecting offshore and onshore and/or other offshore facilities.

Thus, depending on the particular embodiment, the sensing cable 206 may comprise a distributed fiber-optic cable, a cable with fiber optic sensors, a telecommunications cable, an electrical cable, an umbilical cable, a flowline cable, a subsea cable, or an upper completion of a dry-tree well. In some embodiments, the sensing cable 206 may comprise an electrical/fiber-optic hydrophone array (e.g., underwater microphones), geophones, accelerometers, or combinations thereof. These electrical/fiber-optic hydrophone arrays/geophones/accelerometers may be placed in a line on the seafloor 220, fixed in a vertical line in the water column 208, or towed in a horizontal line behind the floating vessel 204. Some of the optical fibers in the subsea environment may have been deployed for different reasons than marine animal monitoring and seismic sensing, i.e. telecommunication purposes, but the same fibers or un-used fibers in the cables may be used for monitoring and sensing purposes.

As illustrated in FIG. 2, the interrogator unit 104 of the DAS system 102 may be deployed on the fixed platform 202 and/or the floating vessel 204, and coupled to the sensing cable 206 that is at least partially positioned within in the water column 208 (e.g., seabed) in a seismic survey area in order to detect and localize a marine mammal 210 before and/or during the seismic survey. In some implementations, the sensing cable 206 may be attached to an electric sensor and an electrical interrogator to receive acoustic data comprising acoustic signals generated by the marine animal.

In some embodiments, the interrogator unit 104 may be further coupled to the processor 112 as shown in FIG. 1. The processor 112 may be a part of the DAS system 102 or a separate processing unit. The processor 112 may be disposed on the fixed platform 202, floating vessel 204, within the towed streamer, or alternatively on another vessel or onshore.

In some embodiments, with the sensing cable 206 (e.g., an array of optical hydrophones or the fiber-optic cable) positioned inside the water column 208, the interrogator unit 104 may launch light, from the light source 108 of the interrogator unit 104 disposed in the interrogator unit 104, into the sensing cable 206. The receiver 110 of the interrogator unit 104 may receive the backscattered light comprising reflected acoustic signals 212 emitted by the marine animal 210 being reflected back to the interrogator 104, where it may be detected and analyzed, using the processor 112, to obtain information associated with marine animal(s) 210. The reflected acoustic signals may comprise marine mammal communications/vocalizations.

In some examples, the sensing cable 206 may comprise an array of electrical hydrophones that receive the acoustic signals 212 (i.e. mammal sounds) emitted by the marine animal 210 and help locate the marine animals that are producing the sounds.

In some embodiments, the array of acoustic sensors across the length of the sensing cable 206 may receive the reflected acoustic signals at different arrival times. Thus, determining the time taken for the acoustic signals 212 to travel from the sound source (e.g., the marine animal 210) to spatially separated optical fiber-optic sensors/optical hydrophones/electrical hydrophones may be used to determine the actual distance between the source and the related sensor. Thus, the time difference of arrival of the reflected acoustic signals 212 at the spatially separated sensors allows to triangulate and assess a location of the marine mammal 210 (i.e. the sound source), and thus the presence and information of the marine animal 210.

In some embodiments, the processor 112 may determine the direction and speed of the marine mammal based on the location and classify a species, a density (number of mammals), a call type, a calling location, distribution, and/or behavioral features of the marine animal 210 based on amplitudes, frequencies, characteristics, or patterns of the reflected acoustic signals 212.

In some embodiments, based on the analysis and classification, the processor 112 may be coupled to a display unit for purpose of displaying the marine animal information and then, to inform/alert the crew and/or seismic source operators for mitigative decision-making such as starting seismic survey using e.g. a soft start of the seismic source to alert the marine mammal 210 to leave the survey area, ceasing or delaying the seismic operations until the marine animal cleared the survey area, or modify seismic operations and operational parameters to avoid affecting the marine animal 210.

In some embodiments, the curative steps or options for changing the course of the seismic survey by modifying operational parameters of a seismic source may comprise 1) modifying the amplitude and/or frequency of the "shots" from an air gun array seismic source, 2) activating/inactivating individual airguns, 3) modifying/reducing air pressure supply to the air gun array, 4) control the sweep speed over the frequency range for a marine vibrator seismic source. In some embodiments, an automated mitigation may be employed when the marine mammal has been detected and preset operational/acquisition parameters are exceeded by a threshold limit.

As such, the disclosed marine monitoring system 200 may provide passive detection of the marine mammal and ways to make decisions to maintain a geographic distance from the detected marine animal as well as the functionality to adjust operational characteristics to avoid the undesired effects on the marine animal.

In some embodiments, by detecting marine mammal communications, and knowing the acoustic velocity profile and bathymetry of the survey area, the location and direction of marine mammals may be determined using techniques similar to microseismic event detection and location. That is, by triangulating acoustic signal arrival times across an array of sensors, and backpropagating through the velocity model, the location and direction of sources may be determined. Moreover, a doppler shift may be used to determine the speed of the marine mammal.

Figure 3:
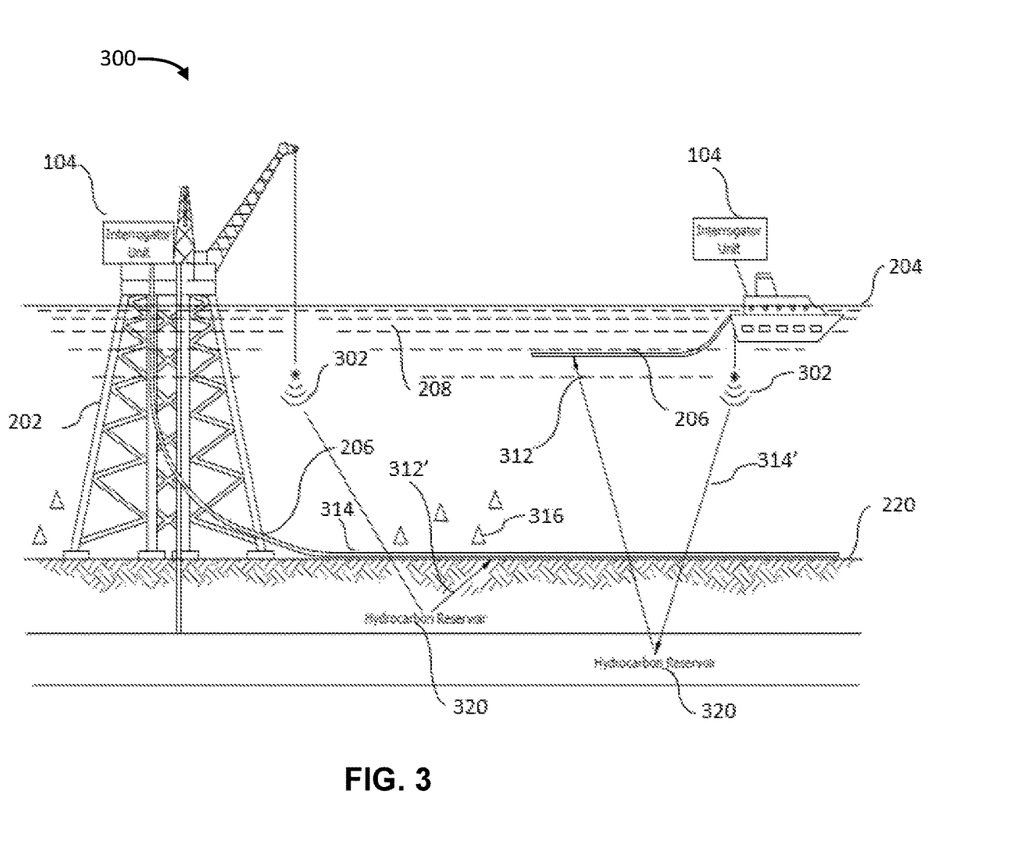
FIG. 3 illustrates an exemplary arrangement for performing a marine seismic surveying in accordance with embodiments of the present disclosure.

FIG. 3 illustrates an exemplary arrangement for performing marine seismic surveying in accordance with embodiments of the present disclosure. In some embodiments, the marine mammal monitoring system 200 may be employed before and/or during the marine seismic survey. In some embodiments, in addition to the passive monitoring of marine mammal communications using the sensing cable, the same sensing cable 206 may also be utilized for recording/sensing seismic signals received during the seismic survey.

In some embodiments, the marine seismic survey system 300 may include the seismic source 302 lowered from the fixed platform 202 and/or towed from the same floating vessel 204 or by a separate vessel, and the sensing cable 206. Examples of seismic source 302 may include without limitation, an air gun array, a seismic marine vibrator, an electromagnetic (EM) source, or any other suitable vibration source for creating seismic waves in the water column 208. In some embodiments, the air gun array may consist of one or more sub-arrays with multiple airguns of different sizes suspended below a surface float. The umbilical supplies air, power, and telemetry to the airguns, associated hardware, and the near-field hydrophone mounted above each airgun location. The air gun array seismic source signal may be designed based on a selection of a number of air guns, their sizes, air pressure, and gun firing timing. In some embodiments, the marine vibrator source may perform sweeping of a signal through a frequency range that includes a plurality of frequency bands. In some embodiments, air gun arrays and seismic marine vibrators may be used for seismic surveying, whereas the EM sources may be used for detecting anomalies in resistivity associated with hydrocarbon reservoirs. The EM sources may require sensors that record electrical responses associated with the type of electromagnetic source used.

In some embodiments, the marine seismic survey system 300 may include the same sensing cable 206 coupled to the interrogator unit 104. In some embodiments, the sensing cable 206 may be positioned on a towed streamer that is towed behind the seismic source 302. The sensing cable 206 may include a plurality of one or more receiving sensors (e.g., acoustic and/or seismic sensors) used to record both the acoustic signals and seismic signals. The receiving sensors may comprise without limitations, electrical hydrophones, geophones, accelerometers, positioning hydrophones, near field hydrophones (NFH), seafloor sensing arrays (fiber optic, electrical), seafloor point with sensor pods 316, and combinations thereof. In some examples, the sensing cable may comprise a fiber-optic sensing cable, an umbilical, a telecommunication cable, a power cable, and/or like.

In some embodiments, the disclosed continuous real-time marine mammal monitoring may be employed before and/or simultaneously during the seismic survey. After detection of the marine animals, a controlled seismic survey may be soft started using the seismic source 302 to alert the marine mammal to leave the survey area. In some cases, the seismic survey may be ceased until the marine animal cleared the survey area, or modified by 1) reducing and or changing amplitude and/or a frequency of air gun shots from the air gun array, 2) activating or inactivating individual airguns of the air gun array, 3) modifying or reducing air pressure supply to the air gun array, and/or 4) controlling sweep speed over the frequency range for the marine vibrator.

After clearing the survey area, in some embodiments, the seismic survey may be conducted using the seismic source 302 and the same sensing cable 206 to determine the presence or absence of locations of hydrocarbon deposits. During the seismic survey, seismic pulses are generated by the seismic source and transmitted through the water column into the sea bed. Then the reflected signals, recorded by the sensing cable 206, may provide information about the seafloor structure, including the presence of oil or gas.

In some cases, the arrival times or other properties of the detected response signal may be used to construct an acoustic velocity profile for all or part of the region of interest. The velocity profiles from multiple acoustic signals may be used to construct a velocity model for a survey region. In some cases, the velocity model includes a two-dimensional, three-dimensional, or four-dimensional model of the survey region. A velocity model may represent the relative or absolute velocities of acoustic signals in the subsurface region. In some implementations, the velocity profiling data may be used to capture detailed reservoir information.

In some embodiments, the interrogator unit 104 of the DAS system 102 may be triggered, by activation of the seismic source (e.g., air gun shot), to start recording the reflected seismic signals from the different layers of the seafloor offset from each shot point, which may then be processed, such as in the processor, to detect the presence of the hydrocarbons. The travel time may be shortest at the receiving sensor with zero inline offsets. In some embodiments, the DAS system and/or any other system(s) may continuously collect data or may be time triggered at pre-set intervals as long as the system(s) are time synchronized by a global positioning system (GPS). In some embodiments, the seismic source events and recorded data may be synchronized with the GPS to enable accurate depth determination of the seismic signals from the source and seismic subsurface reflection during processing.

As disclosed systems and methods provide a continuous measure of acoustic energy amplitude level as a function of distance from the seismic source, it may be helpful to check if the acoustic energy levels are dangerous for the detected marine animal to avoid affecting the marine animal. The acoustic energy amplitude levels may provide a real-time and accurate determination of the location and the safe distance of the marine animal from the seismic source. For example, when the seismic source output signals are changed, the acoustic level encountered at various distances from the source can change.

Figure 4:
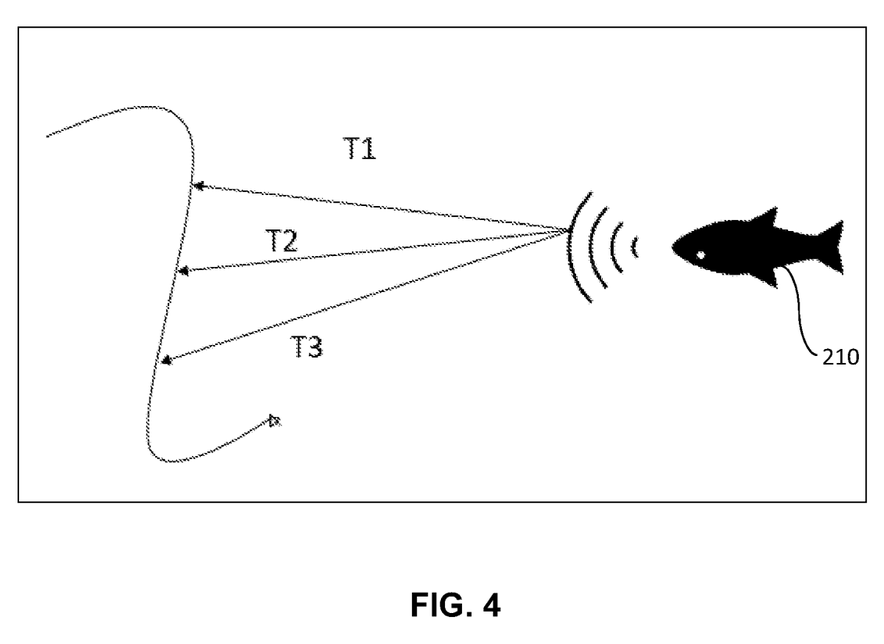
FIG. 4 illustrates a method of locating a marine animal in accordance with embodiments of the present disclosure.

FIG. 4 illustrates a method of locating a marine animal in accordance with embodiments of the present disclosure. As marine animals are always moving in a random trajectory, the position of the marine animal may be assessed from the detected acoustic signals using, without limitation, triangulation. In some embodiments, recorded multiple arrival times (e.g., T1, T2, and T3) of the acoustic signals across an array of acoustic sensors allow to triangulate and assess the location of the marine mammal 210 in three-dimensional space. Localization of the marine mammal may be accomplished by assessing the time delay of arrivals (TDOA). The TDOA method measures the delay in time between the arrivals of signals on of an acoustic signal at multiple spaced acoustic sensors (e.g., spatially separated optical fiber-optic sensors/optical hydrophones/electrical hydrophone) and calculates the range and bearing of the source by triangulating the arrival times. The sensor picking up the sound first may be presumed to be closest to the sound source (i.e. marine animal), and the relative time delay of the signal at all other sensors is used to estimate the absolute location based on the speed of sound.

Once the sound source location has been identified, the marine animal may be further localized and classified. In some embodiments, analysis of the received acoustic signals with the known amplitudes, frequencies, characteristics, and patterns of mammal vocalizations may be utilized to classify a species, a density (number of mammals), a call type, a calling location, a direction, distribution, a speed, and behavioral features of the marine animal. In some embodiments, the classification and analysis may be helpful to provide real-time marine animal information to the crew and/or seismic source operators for mitigative decision-making such as soft-start or ramping-up the seismic survey procedures, ceasing the seismic operations, or modifying the seismic operations in the presence of the marine animal.

Figure 5:
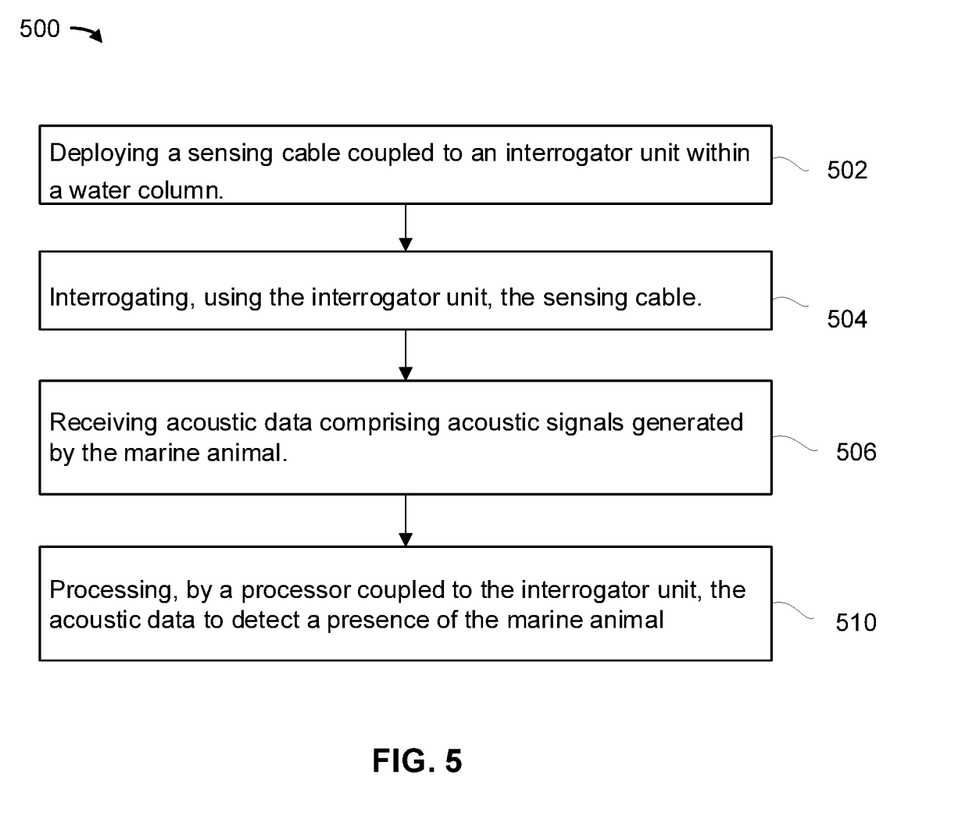
FIG. 5 illustrates a flow chart of an exemplary method of monitoring a marine mammal in accordance with embodiments of the present disclosure.

FIG. 5 illustrates a flow chart of an exemplary method 500 of monitoring a marine mammal in a marine environment in accordance with embodiments of the present disclosure. As discussed above, method 500 may be implemented by the interrogator unit 104 and the sensing cable 206 attached to the interrogator unit 104. The sensing cable 206 may comprise a fiber-optic cable, a telecommunications cable, a power cable, an umbilical cable, a flowline, a subsea cable, an array of optical hydrophones, and/or an array of electrical hydrophones, or the like. This is not limited in this embodiment of this application. The method may be implemented by using the following steps 502 to 508.

At step 502, the method 500 may comprise deploying the sensing cable within a water column.

At step 504, the method 500 may comprise interrogating, using the interrogator unit, the sensing cable.

At step 506, the method 500 may comprise receiving acoustic data comprising acoustic signals generated by the marine animal.

At step 508, the method 500 may comprise processing, by a processor coupled to the interrogator unit, the acoustic data to detect a presence of the marine animal.

ADDITIONAL DISCLOSURE

The following are non-limiting, specific embodiments in accordance with the present disclosure:

A first embodiment, which is a method of monitoring a marine animal in a marine environment, implemented by an interrogator unit and a sensing cable attached to the interrogator unit, comprising deploying the sensing cable within a water column, interrogating, using the interrogator unit, the sensing cable, receiving acoustic data comprising acoustic signals generated by the marine animal, and processing, by a processor coupled to the interrogator unit, the acoustic data to detect a presence of the marine animal.

A second embodiment, which is the method of the first embodiment, wherein the acoustic signals comprise marine mammal vocalizations.

A third embodiment, which is the method of any of the first and the second embodiments, wherein the sensing cable comprises a fiber-optic cable, a telecommunications cable, a power cable, an umbilical cable, a flowline, a subsea cable, an array of optical hydrophones, and/or an array of electrical hydrophones.

A fourth embodiment, which is the method of any of the first through the third embodiments, wherein the sensing cable comprises a plurality of acoustic sensors configured to receive the acoustic data, and wherein the processing comprises determining arrival time of each acoustic signal across the acoustic sensors, and triangulating the acoustic signals based on the arrival time to determine a location of the marine animal.

A fifth embodiment, which is the method of any of the first through the fourth embodiments, further comprising determining a direction and a speed of the marine animal based on the location.

A sixth embodiment, which is the method of any of the first through the fifth embodiments, further comprising processing the acoustic signals for classifying a type of call, a species, a density, an abundance, and/or behavior of the marine animal.

A seventh embodiment, which is the method of any of the first through the sixth embodiments, further comprising classifying the type, the species, the density, and/or the behavior of the marine animal based on amplitudes, frequencies, characteristics, or patterns of the acoustic signals.

An eighth embodiment, which is the method of any of the first through the seventh embodiments, further comprising informing, based on the classifying, an operator about the presence of the marine animal for controlling a seismic survey, wherein controlling the seismic survey includes starting the seismic survey, stopping the seismic operations, or modifying the seismic survey.

A ninth embodiment, which is the method of any of the first through the eighth embodiments, further comprising activating a seismic source by emitting a seismic signal within the water column to produce seismic excitations, wherein the seismic source comprises an air gun array or a marine vibrator, and recording, in response to the seismic excitations and using the sensing cable, backscattered seismic signals to detect a presence of hydrocarbon reservoirs.

A tenth embodiment, which is the method of any of the first through the ninth embodiments, wherein the sensing cable comprises a plurality of receiving sensors including electrical hydrophones arrays, geophones, accelerometers, positioning hydrophones, near field hydrophones (NFH), seafloor fiber-optic sensing arrays, seafloor electrical sensing arrays, seafloor point with sensor pods, interferometric sensors, and combinations thereof.

An eleventh embodiment, which is the method of any of the first through the tenth embodiments, wherein the marine animal comprising at least one of a fish, a crustacean, a cephalopod, or a marine mammal.

A twelfth embodiment, which is the method of any of the first through the eleventh embodiments, further comprising disposing the interrogator unit on a sub-sea structure, a sea bed, a seafloor, a fixed platform, or a floating vessel.

A thirteenth embodiment, which is a system of monitoring a marine animal in a marine environment, the system comprising at least one distributed acoustic sensing (DAS) system comprising a fiber-optic cable deployed within a water column, an interrogator unit coupled to the fiber optic cable and configured to direct light into the fiber optic cable, and receive backscattered light along the fiber optic cable, the backscattered light comprising acoustic signals generated by the marine animal, and a processor coupled to the interrogator unit and configured to process the received acoustic signals to detect a presence of the marine animal.

A fourteenth embodiment, which is the system of the thirteenth embodiment, wherein the fiber-optic cable comprises a plurality of acoustic sensors configured to receive the backscattered light, and wherein the processor is further configured to determine arrival time of each acoustic signal across the acoustic sensors and triangulate the acoustic signals based on the arrival time to determine a location of the marine animal.

A fifteenth embodiment, which is the system of any of the thirteenth through the fourteenth embodiments, wherein the processor is further configured to classify a type of call, a species, a density, and/or behavior of the marine animal based on amplitudes, frequencies, characteristics, or patterns of the received acoustic signals.

A sixteenth embodiment, which is the system of any of the thirteenth through the fifteenth embodiments, wherein the processor is further configured to inform, based on the classifying, an operator about the presence of the marine animal for controlling a seismic survey, wherein controlling the seismic survey includes starting the seismic survey, stopping the seismic operations, or modifying the seismic survey.

A seventeenth embodiment, which is the system of any of the thirteenth through the sixteenth embodiments, wherein the interrogator unit is triggered by activating a seismic source and further configured to record seismic signal levels emitted by the seismic source, and wherein the seismic source comprises an air gun array or a marine vibrator.

An eighteenth embodiment, which is the system of any of the thirteenth through the seventeenth embodiments, wherein the recorded seismic signals are synchronized with a global positioning system (GPS) device to detect a presence of hydrocarbon reservoirs.

A nineteenth embodiment, which is the system of any of the thirteenth through the eighteenth embodiments, wherein the marine animal comprising at least one of a fish, a crustacean, a cephalopod, or a marine mammal.

A twentieth embodiment, which is the system of any of the thirteenth through the nineteenth embodiments, wherein the DAS system is disposed on a sub-sea structure, a sea bed, a sea-floor, a fixed platform, or a floating vessel.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method of monitoring a marine animal in a marine environment, implemented by an interrogator unit and a sensing cable attached to the interrogator unit, the method comprising:
   deploying the sensing cable within a water column;
   interrogating, using the interrogator unit, the sensing cable;
   receiving acoustic data comprising acoustic signals generated by the marine animal;
   processing, by a processor coupled to the interrogator unit, the acoustic data to determine real-time marine animal information, wherein the marine animal information includes a type of call, a calling location, a species, a density, an abundance, and behavior of the marine animal; and
   automatically controlling a seismic survey based on the real-time marine animal information.

2. The method of claim 1, wherein the acoustic signals comprise marine mammal vocalizations.

3. The method of claim 1, wherein the sensing cable comprises a fiber-optic cable, a telecommunications cable, a power cable, an umbilical cable, a flowline, a subsea cable, an array of optical hydrophones, and/or an array of electrical hydrophones.

4. The method of claim 1, wherein the sensing cable comprises a plurality of acoustic sensors configured to receive the acoustic data, and wherein the processing comprises:
   determining arrival time of each acoustic signal across the acoustic sensors; and
   triangulating the acoustic signals based on the arrival time to determine a location of the marine animal.

5. The method of claim 4, further comprising determining a direction and a speed of the marine animal based on the location.

6. The method of claim 4, further comprising processing the acoustic data for classifying the marine animal information.

7. The method of claim 6, further comprising classifying the marine animal information based on amplitudes, frequencies, characteristics, or patterns of the acoustic signals.

8. The method of claim 6, further comprising informing, based on the classifying, an operator about the presence of the marine animal for controlling the seismic survey, wherein controlling the seismic survey includes starting the seismic survey, stopping the seismic operations, or modifying the seismic survey.

9. The method of claim 1, further comprising simultaneously conducting the seismic survey with the one or more sources and the sensing cable, wherein simultaneously conducting the seismic survey comprises:
   activating a seismic source by emitting a seismic signal within the water column to produce seismic excitations, wherein the seismic source comprises an air gun array or a marine vibrator; and
   recording, in response to the seismic excitations and using the sensing cable, backscattered seismic signals detect a presence of hydrocarbon reservoirs.

10. The method of claim 9, wherein the sensing cable comprises a plurality of receiving sensors including electrical hydrophones arrays, geophones, accelerometers, positioning hydrophones, near field hydrophones (NFH), seafloor fiber-optic sensing arrays, seafloor electrical sensing arrays, seafloor point with sensor pods, interferometric sensors, and combinations thereof.

11. The method of claim 1, wherein the marine animal comprising at least one of a fish, a crustacean, a cephalopod, or a marine mammal.

12. The method of claim 1, further comprising disposing the interrogator unit on a sub-sea structure, a sea bed, a seafloor, a fixed platform, or a floating vessel.

13. A system of monitoring a marine animal in a marine environment, the system comprising at least one distributed acoustic sensing (DAS) system comprising:
   a fiber-optic cable deployed within a water column;
   an interrogator unit coupled to the fiber optic cable and configured to:
      direct light into the fiber optic cable; and
      receive backscattered light along the fiber optic cable, the backscattered light comprising acoustic signals generated by the marine animal;
   a processor coupled to the interrogator unit and configured to process the acoustic signals to determine real-time the marine animal information, wherein the marine animal information includes a type of call, a calling location, a species, a density, an abundance, and behavior of the marine animal; and
   automatically controlling a seismic survey based on the real-time marine animal information.

14. The system of claim 13, wherein the fiber-optic cable comprises a plurality of acoustic sensors configured to receive the backscattered light, and wherein the processor is further configured to:
   determine arrival time of each acoustic signal across the acoustic sensors;
   triangulate the acoustic signals based on the arrival time to determine a location of the marine animal.

15. The system of claim 14, wherein the processor is further configured to classify the marine animal information based on amplitudes, frequencies, characteristics, or patterns of the acoustic signals.

16. The system of claim 15, wherein the processor is further configured to inform, based on the classifying, an operator about the presence of the marine animal for controlling the seismic survey, wherein controlling the seismic survey includes starting the seismic survey, stopping the seismic operations, or modifying the seismic survey.

17. The system of claim 13, wherein the DAS system is triggered by activating a seismic source and further configured to record seismic signal levels emitted by the seismic source, and wherein the seismic source comprises an air gun array or a marine vibrator.

18. The system of claim 17, wherein the recorded seismic signals are synchronized with a global positioning system (GPS) device to detect a presence of hydrocarbon reservoirs.

19. The system of claim 13, wherein the marine animal comprising at least one of a fish, a crustacean, a cephalopod, or a marine mammal.

20. The system of claim 13, wherein the DAS system is disposed on a sub-sea structure, a sea bed, a seafloor, a fixed platform, or a floating vessel.

* * * * *